(12) United States Patent
Montan et al.

(10) Patent No.: US 11,444,313 B2
(45) Date of Patent: Sep. 13, 2022

(54) BATTERY MODULE, IN PARTICULAR FOR A MOTOR VEHICLE, HAVING AT LEAST ONE BATTERY CELL SUBJECTED TO FORCE AND AT LEAST ONE DEFORMABLE INTERLAYER

(71) Applicants: RÖCHLING AUTOMOTIVE SE & CO. KG, Mannheim (DE);
BAYERISCHE MOTOREN WERKE AKTIENGESELLSCHAFT, Munich (DE)

(72) Inventors: Dirk Montan, Heidelberg (DE);
Richard Koehnsen, Maulbronn (DE);
Karsten Grebel, Bürstadt (DE); Rene Falk, Achern (DE); Tuncay Idikurt, Munich (DE)

(73) Assignees: Röchling Automotive SE & Co. KG, Mannheim (DE); Bayerische Motoren Werke Aktiengesellschaft, Munich (DE)

( * ) Notice: Subject to any disclaimer, the term of this patent is extended or adjusted under 35 U.S.C. 154(b) by 94 days.

(21) Appl. No.: 16/609,279

(22) PCT Filed: Jun. 4, 2018

(86) PCT No.: PCT/EP2018/064655
§ 371 (c)(1),
(2) Date: Oct. 29, 2019

(87) PCT Pub. No.: WO2018/224451
PCT Pub. Date: Dec. 13, 2018

(65) Prior Publication Data
US 2020/0067127 A1 Feb. 27, 2020

(30) Foreign Application Priority Data

Jun. 7, 2017 (DE) ..................... 10 2017 209 612.8

(51) Int. Cl.
*H01M 10/04* (2006.01)
*H01M 50/20* (2021.01)
*H01M 10/48* (2006.01)

(52) U.S. Cl.
CPC ....... *H01M 10/0481* (2013.01); *H01M 50/20* (2021.01); *H01M 10/482* (2013.01); *H01M 2220/20* (2013.01)

(58) Field of Classification Search
CPC . H01M 10/0481; H01M 10/482; H01M 50/20
(Continued)

(56) References Cited

U.S. PATENT DOCUMENTS 7,087,344 B2 8/2006 Kaneta
9,070,926 B2 6/2015 Seong et al.
(Continued)

FOREIGN PATENT DOCUMENTS

CN 104781947 A 7/2015
DE 102010012998 A1 9/2011
(Continued)

OTHER PUBLICATIONS

Mitsubishi Chemical Advanced Materials, SymaLITE®, 2022 (Year: 2022).*
(Continued)

*Primary Examiner* — Sean P Cullen
(74) *Attorney, Agent, or Firm* — Rankin, Hill & Clark LLP

(57) ABSTRACT

A battery module, in particular for a motor vehicle, encompassing at least one battery cell that is received, in a manner impinged upon by compressive force along a spacing axis, between two pressure surfaces arranged with a spacing from one another along the spacing axis and clamped toward one another; at least one interlayer additionally being provided along the spacing axis between the pressure surfaces; the
(Continued)

interlayer, constituting an LWRT interlayer, encompasses a porous LWRT material having a thermoplastically bonded fiber tangle.

15 Claims, 1 Drawing Sheet

(58) Field of Classification Search
USPC .......................................... 429/149, 156, 159
See application file for complete search history.

(56) References Cited

U.S. PATENT DOCUMENTS

| | | | |
|---|---|---|---|
| 9,680,178 | B2 | 6/2017 | Deponte et al. |
| 9,705,156 | B2 | 7/2017 | Dorsch |
| 9,882,177 | B2 | 1/2018 | Thurmeier et al. |
| 10,243,180 | B2 | 3/2019 | Brenner et al. |
| 2013/0130087 | A1* | 5/2013 | Kawaguchi ......... H01M 10/658 429/120 |
| 2013/0309464 | A1* | 11/2013 | Pfaffelhuber ............. B32B 5/26 264/258 |
| 2015/0214570 | A1* | 7/2015 | Deponte ........... H01M 10/0481 429/99 |
| 2016/0197373 | A1 | 7/2016 | Shaffer, II et al. |
| 2017/0222199 | A1 | 8/2017 | Idikurt et al. |

FOREIGN PATENT DOCUMENTS

| | | | | |
|---|---|---|---|---|
| DE | 102012015919 A1 | * | 2/2014 | ......... H01M 50/116 |
| DE | 102014218379 A1 | | 3/2016 | |
| DE | 102014225367 A1 | | 6/2016 | |

OTHER PUBLICATIONS

Mitsubishi Chemical Advanced Materials, GMT, 2022 (Year: 2022).*
Polyrocks, LWRT (Lightweight reinforced thermoplastic), 2022 (Year: 2022).*
Cannon, Lightweight Reinforced Thermoplastics, 2022 (Year: 2022).*
Hanwha Azdel, Light-Weight Reinforced Thermoplastic, 2022 (Year: 2022).*
International Search Report for corresponding PCT/EP2018/064655 dated Sep. 19, 2018, 13 pgs.
German Search Report for corresponding DE 10 2017 209 612.8 dated Jan. 16, 2018, 9 pgs.
Espacenet Bibliographic data:DE 102014225367 (A1), Published Jun. 16, 2016, 2 pgs.
Espacenet Bibliographic data:DE 102014218379 (A1), Published Mar. 17, 2016, 2 pgs.
Espacenet Bibliographic data:DE 102010012998 (A1), Published Sep. 29, 2011, 1 pg.
English Translation of International Preliminary Report on Patentability for corresponding PCT/EP2018/064655 dated Dec. 10, 2019, 8 pgs.
Chinese Office Action for corresponding 201880018604.5 dated Jan. 29, 2022, 8 pgs.
Espacenet Bibliographic data:CN 104781947(A), Published Jul. 15, 2015, 1 pg.

* cited by examiner

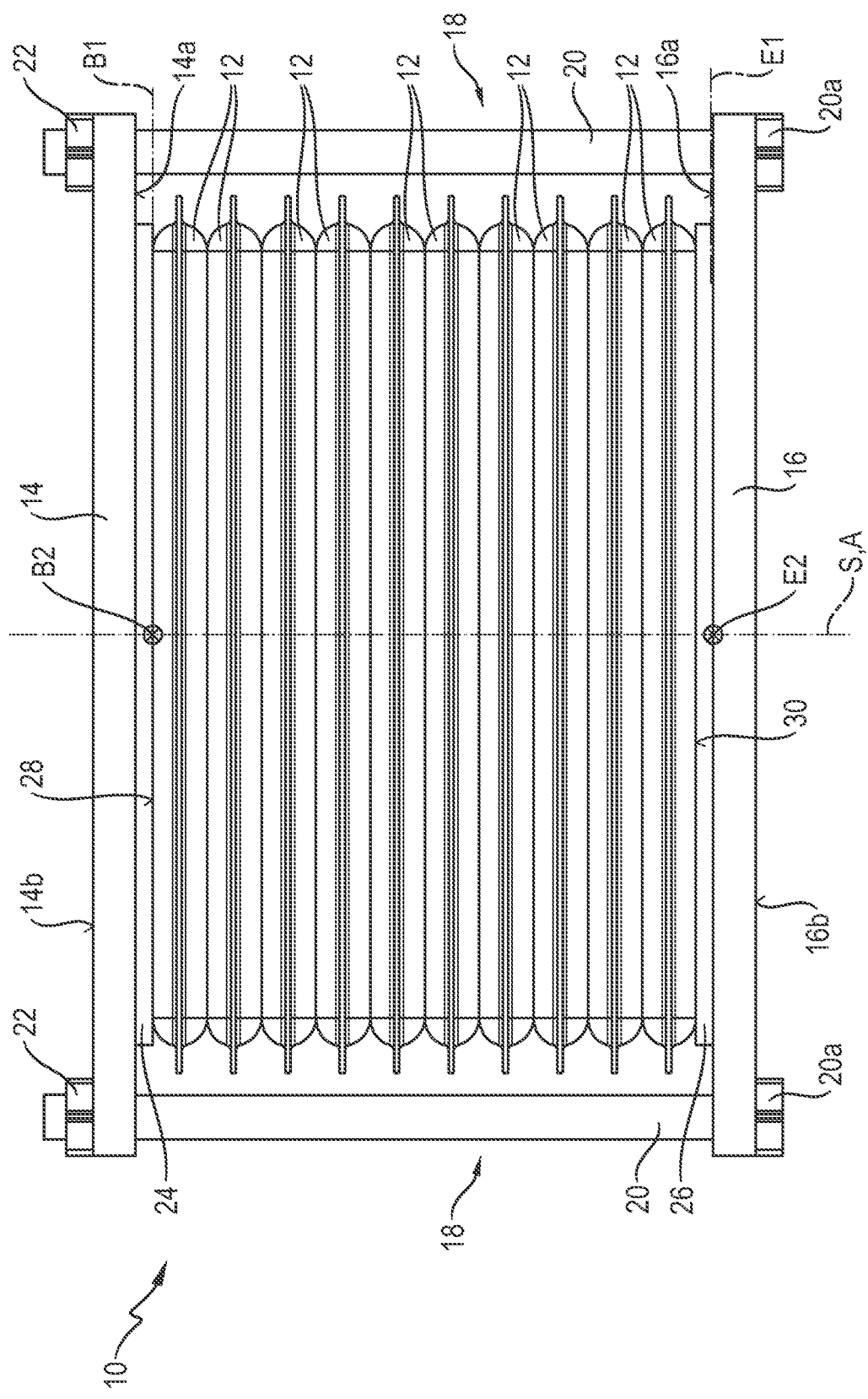

BATTERY MODULE, IN PARTICULAR FOR A MOTOR VEHICLE, HAVING AT LEAST ONE BATTERY CELL SUBJECTED TO FORCE AND AT LEAST ONE DEFORMABLE INTERLAYER

The present invention relates to a battery module, encompassing at least one battery cell that is received, in a manner impinged upon by compressive force along a spacing axis, between two pressure surfaces arranged with a spacing from one another along the spacing axis and clamped toward one another; at least one interlayer additionally being provided along the spacing axis between the pressure surfaces. The battery module is preferably embodied for use as an energy source in a motor vehicle.

BACKGROUND OF THE INVENTION

A battery module of the species is known, for example, from DE 102 60 798 B4. This document presents a planar battery cell that is impinged upon by compressive force and is arranged between two pressure plates clamped toward one another. A rubber plate, constituting an interlayer, is arranged between the two pressure plates and each side of the battery cell which faces toward a pressure plate. The rubber plates known from DE 102 60 798 B4 are provided in order to distribute as uniformly as possible, over that surface of the battery cell which faces toward the respective pressure plate, a compressive force exerted by the pressure plates onto the battery cell.

DE 10 2014 221 493 A1 discloses a battery module having all the features of the preamble of claim 1. This known battery module comprises several battery cells arranged between two end-located pressure plates, a respective interlayer being received both between the pressure plates and the battery cell respectively located closest to them and between two battery cells succeeding one another along the spacing axis. The interlayers known from this document expressly do not abut with full coverage against a battery cell immediately adjacent to the interlayer, in order thereby to exert compressive force on the battery cell only in an abutment region in which the interlayer and the battery cell abut in direct contact against one another, and in order to provide the battery cell with space for volume expansion in a spacing region in which an interface of the interlayer is arranged at a spacing from the closest battery cell.

The reason is that in the battery modules under discussion here, a volume expansion occurs at the battery cells during operation of the battery module, and attempts are made in terms of design to counteract it by an impingement of compressive force. Battery cells or battery-cell stacks are therefore usually clamped between two pressure surfaces.

One reason for a steady increase in the volume of battery cells during operation thereof is the formation and deposition of crystals in the battery cells, which occurs in chemical reservoirs for electrical energy. Crystal formation or crystal deposition can be counteracted by exerting compressive force, i.e. by elevating the pressure existing in the battery cell. Crystal formation or crystal growth can thereby be slowed down, but not entirely shut off. An increase in volume over their operating life therefore occurs even in battery cells clamped between pressure surfaces, resulting in disadvantages in terms of the performance of the batteries. Specifically, if the battery cells are rigidly clamped between pressure surfaces, the aforesaid crystal formation, and the increase associated therewith in the volume of the battery cells, results in a further increase in pressure in the battery cells of a battery module beyond the already elevated pressure established by the pressure surfaces in the context of manufacture of the battery module. The battery cells can be damaged by the further increase in pressure in the battery cells over their operating life, and this has a negative effect on their service life.

A further reason for a cyclic change in the volume of a battery cell is the charging and discharging operations occurring in the battery cell, which cause an increase and then a decrease in the volume of the chemical energy reservoir that is represented by a battery.

In terms of modelling, the change in volume of a battery cell is therefore a superposition of a steady volume increase and a cyclic volume increase and volume decrease.

The compressive force that can be exerted on the battery cells by the rubber plates described in DE 102 60 798 B4 is limited if the rubber plates, preloaded by the pressure plates, are intended to retain at least a residual elasticity in order to take into account the volume expansion component of the charge-state-dependent cyclic change in volume of battery cells. If the rubber plates are, on the other hand, preloaded to their elasticity limit, here as well an expansion reserve must be provided for the crystallization-induced expansion in the volume of the battery cells. The battery cells of this known battery cell are therefore only suboptimally preloaded.

The approach described in DE 10 2014 221 493 A1 does furnish an expansion space for the battery cells, but only at the cost of a decreased compressive force impingement area and thus an inhomogeneous compressive force impingement on the battery cells over their area of extent. Although it is thereby possible to avoid pressure-induced damage to the battery cells, the above-described crystal formation is counteracted less effectively than with full-coverage abutment of the interlayers against the battery cells.

DE 10 2014 225 367 A1 discloses a battery module in which a plurality of battery cells are arranged with no provision of interlayers between the pressure surfaces that impinge with compressive force on the battery cells. With this known battery module, however, a pressure plate comprising a pressure surface can be impinged upon by compressive force by way of a modifiable-load pressure apparatus, so that with this battery module, the force with which the two pressure surfaces are clamped toward one another is modifiable.

It is thereby possible to decrease the pressure exerted by the pressure surfaces on the battery cells in order to reduce the elevated pressure in the battery cells due to crystal formation, so that the pressure in the battery cells can be kept approximately constant over their operating life. As a result of the modifiable-load pressure apparatus, however, the known battery module occupies an undesirably large volume of installation space.

SUMMARY OF THE INVENTION

An object of the present invention is therefore to refine a battery module of the kind recited previously in such a way that the pressure in the at least one battery cell can be kept approximately constant over its operating life, so that crystal formation in the battery cell is always optimally counteracted, over essentially its entire service life, by a substantially constant impingement of pressure. Crystal formation in the battery cells can thereby be reduced to very low formation rates over the longest possible time period, which on the hand extends the service life of the battery module and on the other hand allows the battery module to exhibit maximally constant performance over its service life.

This object is achieved according to the present invention by a battery module of kind recited previously in which the interlayer, constituting an LWRT interlayer, encompasses a porous LWRT material having a thermoplastically bonded fiber tangle.

The reason is that it has been found, surprisingly, that porous LWRT material, i.e. porous thermoplastically bonded fiber tangle, is optimally suited for used in battery modules because of its material behavior under load. The LWRT material exhibits simultaneously plastic and elastic deformation behavior when externally loaded in value ranges that are usual for battery modules.

The charge-state-dependent cyclic changes in volume that were explained earlier can thus be absorbed by the elastic material behavior of LWRT, so that the interlayer that encompasses LWRT can deform along with the cyclic changes in volume upon reception and output of energy by the at least one battery cell, and the interlayer reversibly resets itself again.

The plastic deformation of LWRT material occurs slowly as compared with the elastic deformation, and therefore over a longer time period. The short-term (compared with the slow and steady crystallization-induced volume increase) cyclic changes in volume therefore produce no appreciable plastic deformation because of their comparatively short cycle times. Conversely, the slow but steady increase in volume due to crystal formation produces no elastic deformation, and instead the load on the LWRT material caused by the crystal formation-induced increase in volume is dissipated again by that material as a result of plastic flow.

It is thereby possible, by using interlayers that encompass LWRT material, to create a battery module that maintains a substantially constant compressive load on the at least one battery cell over the service life of the battery cell despite the aforesaid volume-change effects occurring at the at least one battery cell, and does not require any more installation space than a conventional battery module of the same rated capacity.

It is necessary in this context that the LWRT material be porous. It must therefore not be completely compacted into a solid fiber-reinforced plastic block. The porosity is necessary in order to produce the elastic/plastic material behavior that is advantageous for use in a prestressed battery module.

A "battery module" for purposes of the present Application is considered to be any chemical reservoir of electrical energy which is constructed in accordance with the provisions of the present Application. It need not obligatorily be rechargeable, but that is preferred.

The battery module according to the present invention which is described here can be used wherever a reservoir of electrical energy is required. The battery module according to the present invention is preferably embodied for use as a mobile battery module, particularly preferably as an electrical energy reservoir in vehicles having an electric propulsion system. The electric propulsion system can be the only propulsion system, or can supplement a propulsion system using an internal combustion engine. The present invention therefore also relates to a vehicle having a battery module as described here.

"LWRT" stands for "low weight reinforced thermoplastic," which is to be understood generally to mean thermoplastically bonded directed fibers or fiber tangles; polyolefins, i.e. either polypropylene or polyethylene, are used as a rule as a thermoplastic bonding material. Other thermoplastic bonding materials are, of course, not excluded. Any fibers are conceivable as fibers, provided they exist in dimensionally stable fashion at temperatures at which the thermoplastic bonding material softens or melts. Such fibers are, for example, glass fibers or carbon fibers. Also conceivable, however, are mineral fibers such as rock wool; natural fibers, in particular carbonized natural fibers; or also plastic fibers made of or having a plastic having a higher softening point and/or melting point that that of the bonding material. The plastic fibers can also be carbonized in order to achieve high tensile strengths. Plastic fibers that can be used are, for example, polyester fibers, in particular made of PET.

Although in order to achieve the advantages of the present invention it can be sufficient for the LWRT interlayer to comprise only the porous LWRT material and in addition to encompass other materials or non-porous portions made of substances also used in the LWRT material, and/or to encompass another material, it is advantageous in terms of achieving the advantages of the present invention to the greatest possible extent if the LWRT interlayer is constituted from porous LWRT material. Preferably the LWRT interlayer is a planar, particularly preferably a flat, interlayer. "Planar" means here that the dimension of the LWRT interlayer in its surface extent is substantially greater, for example by a factor or 10 or more, than in its thickness direction orthogonal to the surface extent.

Although the battery module according to the present invention can comprise only a single battery cell, in order to increase the capacity of the battery module it is advantageous if a plurality of battery cells, arranged one behind another along the spacing axis, are received between the pressure surfaces.

With a preferred arrangement of a plurality of battery cells between the pressure surfaces, those battery cells form a battery-cell stack, the battery cells being stacked in the battery module along a stacking axis that is parallel to, or coincides with, the spacing axis. The battery cells are again preferably planar battery cells in the sense defined above, each battery cell comprising a cathode, an anode, and a separator component provided between the cathode and anode.

Purely in principle, an LWRT interlayer can be arranged both between two battery cells adjacent along the spacing axis and between a pressure surface and a battery cell adjacent to it along the spacing axis. Because the pressure surfaces, or the components comprising the pressure surfaces, are usually housing- or frame-mounted components, the result of arranging the LWRT interlayer at an increasing distance from the pressure surfaces is that, because of the interlayer's deformability, the battery cells adjoining those surfaces can be displaced not only along the spacing axis but also orthogonally thereto. In order to achieve a maximally stable battery module it is therefore preferred if an LWRT interlayer is arranged along the spacing axis between a pressure surface and the at least one battery cell. In the case of the aforementioned plurality of battery cells, the LWRT interlayer is arranged between the pressure surface and that battery cell which is closest to the pressure surface along the spacing axis. This makes possible a stable connection between the interlayer and the pressure surface, so that it is in fact deformable only along the spacing axis. The LWRT interlayer can then be fastened in fixed and secure fashion, for example by adhesive bonding, on the pressure surface or on a component comprising the pressure surface, for example a pressure plate.

Loads induced by changes in volume of the at least one battery cell can be dissipated to an even greater extent if one respective LWRT interlayer is arranged between each of the two pressure surfaces and the at least one battery cell. The battery module can accordingly comprise a plurality of LWRT interlayers, preferably the aforesaid two LWRT interlayers, one on each pressure surface.

In a manner known per se, at least one of the pressure surfaces can be embodied on a pressure plate. The other pressure surface can be embodied on a portion of a battery-module housing, for example on a housing bottom of a battery-module housing.

The statement in the present Application that the pressure surfaces are "clamped toward one another" is not intended to indicate that each of the pressure surfaces is loaded toward the respective other pressure surface by a separate force device associated with it. It is sufficient for this purpose, on the principle of "action=reaction," if one pressure surface is implemented on a housing- or frame-mounted component and only the component having the respective other pressure surface is impinged upon with force by a force device. For purposes of the present Application, pressure surfaces are already "clamped toward one another" when a force directed toward the respective other pressure surface acts on each of the pressure surfaces.

When the two pressure surfaces are each arranged on a pressure plate, the pressure plates can be connected to one another by connecting struts, for example in the form of threaded rods or rods having respective end-located threads, or by bolts; the pressure plates can be clamped toward one another in particular simple mechanical fashion by using at least threaded end portions on the struts. A clamping force acting between the pressure surfaces can be adjusted very accurately by way of clamping nuts on the connecting struts. The connecting struts can also be embodied in the manner of a bolt, i.e. having a head in one end region and having a thread at the other end region.

The two pressure surfaces are preferably each embodied on a pressure plate. For particularly secure and stable reception of an LWRT interlayer on a pressure plate, it is advantageous if it is the case, for each pressure plate immediately adjacent to an LWRT interlayer along the spacing axis, that the pressure plate projects along at least one extent axis, orthogonally to the spacing axis, beyond the LWRT interlayer that is closest to it along the spacing axis.

Because the pressure plate as a rule is embodied to be more stable than the LWRT interlayer, i.e. because it deforms less severely under a given load, with the aforesaid projection of the LWRT interlayer no edge effects also occur at the edge of the LWRT interlayer as a result of the pressure plate, for example displacement of an edge region of the LWRT interlayer instead of deformation thereof, and the like. For the reason recited, the pressure plate projects along at least two mutually orthogonal extent axes, orthogonally to the spacing axis, beyond the LWRT interlayer that is closest to it along the spacing axis.

For the reasons recited, the statements made regarding the projection beyond the LWRT interlayer by the pressure plate apply correspondingly to the abutment surface along which a battery cell abuts against an LWRT interlayer. In this case the LWRT interlayer preferably projects along at least one abutment axis, preferably along two mutually orthogonal abutment axes, orthogonally to the spacing axis, beyond the abutment surface.

The pressure plate thus preferably surrounds the LWRT interlayer closest to it, in complete and continuous fashion, in a circumferential direction around the spacing axis. The LWRT interlayer likewise surrounds the abutment surface along which a battery cell abuts against it, preferably in complete and continuous fashion, in the circumferential direction.

Preferably the LWRT interlayer not only is placed between two components—preferably a pressure plate on the one hand and a battery cell on the other hand—but also is immobilized on at least one of the components. In particularly simple fashion, the LWRT interlayer can be adhesively bonded to the component that is directly adjacent to it along the spacing axis. That component can be a component carrying a pressure surface, for example a pressure plate or a housing portion of a battery-module housing, as has already been explained above. That component can also be a battery cell. Possibly, but less preferably, the LWRT interlayer can also be arranged in sandwich fashion between two battery cells and can then be adhesively bonded, or otherwise connected, to the two battery cells.

Depending on the materials used, the components abutting against the LWRT interlayer can be coated with an adhesion promoter in order to promote an adhesive connection between the component and the LWRT interlayer. As has already been discussed above, one or several LWRT interlayers are preferably only arranged directly adjacent to the two pressure surfaces. A battery-cell stack constituted from a plurality of battery cells can comprise, for example at its stack center or at regular intervals, an LWRT interlayer between two adjacent battery cells along the spacing axis. Preferably, however, the battery-cell stack is devoid of LWRT interlayers, so that it is preferably the case, for at least one sub-group from among the plurality of battery cells arranged one behind another along the spacing axis, that no LWRT interlayer is provided between two respective battery cells of the sub-group which are arranged one behind another along the spacing axis.

These and other objects, aspects, features and advantages of the invention will become apparent to those skilled in the art upon a reading of the Detailed Description of the invention set forth below taken together with the drawing which will be described in the next section.

BRIEF DESCRIPTION OF THE DRAWING

The invention may take physical form in certain parts and arrangement of parts, a preferred embodiment of which will be described in detail and illustrated in the accompanying drawing which form a part hereof and wherein:

The Drawing is a schematic elevation view of an embodiment according to the present invention of a battery module.

DESCRIPTION OF PREFERRED EMBODIMENTS

Referring now to the drawing wherein the showings are for the purpose of illustrating preferred and alternative embodiments of the invention only and not for the purpose of limiting the same, in the drawing, a battery module depicted in a schematic elevation view is labeled in general with the number 10.

In the example depicted, the battery module encompasses a stack of, for example, ten similar battery cells 12 stacked on one another along a stacking axis S. Battery cells 12, preferably of identical design, are preferably stacked in direct contact with one another along stacking axis S, with no interposition of any interlayers.

The volume of battery cells 12, which are each a chemical reservoir for electrical energy, changes during their service life. On the one hand, crystals form over the service life of battery cells 12 as a result of the substances present in battery cells 12; those crystals occupy a greater volume than the same mass of substance in a liquid or non-crystalline phase.

On the other hand, the volume of a battery cell 12 cyclically increases and decreases again as the electrical charge state changes.

Crystallization in battery cells 12 can be counteracted by impinging upon battery cells 12 with compressive force, at least to the extent that the crystallization processes proceed more slowly than without compressive force impingement.

Battery module 10 therefore encompasses two pressure plates 14 and 16 that are arranged with a spacing from one another along a spacing axis A that coincides with stacking axis S of battery cells 12.

Each of pressure plates 14 and 16 comprises a respective pressure surface 14a and 16a facing toward the respective other pressure plate 16 and 14. Pressure plates 14 and 16, and with them the respective associated pressure surfaces 14a and 16a, are clamped toward one another along spacing axis A by clamping means 18. They therefore exert a compressive force on battery cells 12 located between them.

Clamping means 18, which in principle can be configured in any manner, in the present example are space-saving mechanical clamping means 18 and each encompass a bolt 20 and a nut 22. Bolt head 20a of bolt 20 abuts against that outer surface 16b of pressure plate 16 which is located oppositely from pressure surface 16a; nut 22 abuts against that outer surface 14b of pressure plate 14 which is located oppositely from pressure surface 14a and faces away from pressure plate 16 and from battery cells 12.

Instead of a bolt and a nut, mechanical clamping apparatus 18 can also be constituted by a threaded rod and two nuts. As a further alternative instead of the threaded connection, one or several tension rods can be welded to the pressure plates under tensile stress.

In order to impinge upon battery cells 12 as uniformly as possible with compressive force, battery module 10 encompasses several clamping means 18, for example, in the case of battery cells 12 having a rectangular base outline and likewise rectangular pressure plates 14 and 16, one clamping means 18 in each corner region of the rectangular pressure plates 14 and 16.

Pressure plates 14 and 16 are preferably of identical design.

In order to allow battery cells 12 to be impinged upon by an approximately constant compressive force over their service life, one LWRT interlayer 24 (see pressure plate 14) and 26 (see pressure plate 16) is arranged between each pressure plate 14 and 16 and battery cell 12 that is located respectively closest to it. One or both of LWRT interlayers 24 and 26 can be embodied in multiple-layer fashion.

LWRT interlayers 24 and 26 are again preferably of identical design, i.e. they are manufactured from an identical material composition and with component dimensions that are the same in the state prior to installation.

LWRT interlayers 24 and 26 are constituted from thermoplastically bonded fiber tangle, preferably from glass fibers that are thermoplastically bonded with a polyolefin, for example polypropylene or polyethylene, to yield a porous LWRT.

Because of the porosity of LWRT interlayers 24 and 26, they have a deformation behavior that is simultaneously elastic and plastic, with deformation magnitudes sufficient for the present utilization instance. The plastic deformation of the LWRT material occurs very slowly, more slowly than the elastic deformation.

The cyclic change in the volume of battery cells 12, which depends on the electrical charge state, can therefore be compensated for by the elastic deformation component of the LWRT interlayers 24 and 26. With an expansion in volume due to a change in charge, LWRT interlayers 24 and 26 firstly become elastically compressed. When the charge state then changes in the opposite direction, LWRT interlayers 24 and 26 relax back into their original state and thus follow battery cells 12 that are decreasing again in volume.

Conversely, an elevation in the mechanical stress in the battery module which is caused by crystallization that proceeds slowly compared with the cyclic change in volume, and an associated slow but steady growth in the volume of battery cells 12 over their service life, are dissipated in LWRT interlayers 24 and 26 by plastic flow.

The initial state from which LWRT interlayers 24 and 26 elastically deform as a result of the cyclic change in the charge state of battery cells 12 is therefore different at different times, when considered over the service life of battery module 10.

Hypothetically (although this is not the case according to the present invention), if the battery cells were to abut, with no interposition of LWRT interlayers 24 and 26, directly against pressure plates 14 and 16 made, for example, of metal or a reinforced plastic, the pressure (compressive force) exerted on battery cells 12 by pressure plates 14 and 16 in the context of manufacture of the battery cells would then need to be selected so that it does not become so greatly increased, by the unavoidable crystallization-induced expansion in the volume of battery cells 12, and by the pressure elevation in battery cells 12 which is thereby unavoidably brought about in the receiving space delimited by pressure plates 14 and 16, that battery cells 12 become damaged and their service life thereby becomes unnecessarily shortened.

A battery module 10 constituted without placement of LWRT interlayers 24 and 26 that are presented here would therefore exert on battery cells 12, at the beginning of the service life of battery module 10, a compressive force that is less than would be possible and necessary for optimally delaying crystallization in the interior of battery cells 12. The consequence would be that crystallization at first proceeds more quickly than desired, since the pressure in battery cells 12 which impedes it is initially too low. It is only as crystallization proceeds that, as a result of an expansion in the volume of battery cells 12, a pressure that increasingly effectively counteracts crystallization in battery cells 12 is gradually generated in the receiving volume of battery module 10 delimited by pressure plates 14 and 16. By then, however, crystal formation and crystal deposition in battery cells 12 have already reached a level that shortens a service life of battery cells 12, as compared with the service life of similar battery cells 12 in a battery module 10 according to the present invention.

Because LWRT interlayers 24 and 26 dissipate, by plastic flow, a pressure elevation in battery module 10 brought about by an expansion in the volume of battery cells 12, battery module 10 according to the present invention can already be impinged upon, at the beginning of its operating life, with the compressive force that is optimal for delaying crystal growth in battery cells 12. Crystallization in battery cells 12 thus occurs more slowly, and against a counter-pressure that is substantially constant due to the plastic flow of LWRT interlayers 24 and 26. The usable operating life of battery module 10 is thus extended as compared with a battery module of the same capacity and design having no LWRT interlayers.

LWRT interlayers 24 and 26 are preferably connected to the respective pressure plates 14 and 16, and immobilized on the respective pressure surfaces 14a and 16a of pressure plates 14 and 16, by adhesive bonding. Pressure plates 14 and 16 advantageously project beyond LWRT interlayers 24 and 26, preferably on all sides, in a direction orthogonal to stacking axis S and orthogonal to the coaxial spacing axis A, for example along mutually orthogonal extent axes E1 and E2.

LWRT interlayers 24 and 26 abut, along a respective abutment surface 28 and 30, against battery cells 12 that are closest to them along spacing axis A. To allow a compressive force exerted by pressure plates 14 and 16 on battery cells 12 to be introduced into battery cells 12 as uniformly as possible via those abutment surfaces 28 and 30, LWRT interlayers 24 and 26 project beyond the respective abutment surfaces 28 and 30 associated with them, again preferably on all sides, in a direction orthogonal to spacing axis A, for example along the mutually orthogonal abutment axes B1 and B2.

In the example depicted in the drawing, the components depicted (pressure plates 14 and 16, LWRT interlayers 24 and 26, and battery cells 12) are preferably rectangular, so that a view of battery module 10 from a direction rotated 90 degrees around spacing axis A would look substantially the same as what is depicted in the drawing. The spacing of clamping means 18 from one another can be shorter or longer, since pressure plates 14 and 16, LWRT interlayers 24 and 26, and battery cells 12 can (but do not need to) have a dimension, in a direction orthogonal to the drawing plane of the drawing, which deviates from what is depicted in the drawing.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A battery module, encompassing at least one battery cell that is received, in a manner impinged upon by a compressive force along a spacing axis, between two pressure surfaces arranged with a spacing from one another along the spacing axis and clamped toward one another by the compressive force; at least one deformable interlayer additionally being provided along the spacing axis between the two pressure surfaces,
   wherein the at least one deformable interlayer is pre-stressed by the compressive force and encompasses a porous material having a porous thermoplastically bonded fiber angle that exhibits both plastic and elastic deformation behavior when externally loaded; the at least one deformable interlayer being elastically deformed in response to cyclic changes in volume of the at least one battery cell during use of the battery module and the at least one deformable interlayer being plastically deformed in response to a steady increase in volume of the at least one battery cell that proceeds slowly compared with the cyclic changes in volume and that proceeds over a service life of the at least one battery cell, the plastic and elastic deformation behavior of the at least one deformable interlayer allowing to maintain the compressive force along the spacing axis while dissipating a mechanical load caused by the steady increase in volume by plastic flow and while at the same time allowing the at least one battery cell to execute its cyclic volume changes.

2. The battery module according to claim 1, wherein the compressive force acting between the two pressure surfaces is adjustable.

3. The battery module according to claim 1, where the battery module is a battery module for a motor vehicle.

4. The battery module according to claim 1, wherein one of the at least one deformable interlayer is formed of the porous thermoplastically bonded porous fiber angle.

5. The battery module according to claim 1, wherein the porous material having the porous thermoplastically bonded fiber angle comprises thermoplastically bonded directed fibers.

6. The battery module according to claim 1, wherein one of the at least one deformable interlayer abutting against one of the at least one battery cell in an abutment surface projects along at least one abutment axis beyond the abutment surface.

7. The battery module according to claim 1, wherein one of the at least one deformable interlayer abutting against one of the at least one battery cell in an abutment surface projects along two mutually orthogonal abutment axes beyond the abutment surface.

8. The battery module according to claim 1, wherein at least one of the at least one deformable interlayer is adhesively bonded to at least one component that is directly adjacent to the at least one deformable interlayer along the spacing axis.

9. The battery module according to claim 1, wherein the fiber web of the at least one deformable interlayer, encompasses at least one of glass fibers, mineral fibers, natural fibers and plastic fibers.

10. The battery module according to claim 1, wherein the at least one deformable interlayer includes a first deformable interlayer and a second deformable interlayer, the first deformable interlayer and the second deformable interlayer each encompass the pre-stressed porous material having the porous thermoplastically bonded porous fiber angle, the two pressure surfaces includes a first pressure surface and a second pressure surface, the first deformable interlayer is arranged between the first pressure surface and the at least one battery cell and the second deformable interlayer is arranged between the second pressure surface and the at least one battery cell.

11. The battery module according to claim 1, wherein the at least one battery cell is a plurality of battery cells, arranged one behind another along the spacing axis, received between the two pressure surfaces.

12. The battery module according to claim 11, wherein in at least one sub-group from among the plurality of battery cells arranged one behind another along the spacing axis no deformable interlayer encompassing porous material having a thermoplastically bonded fiber angle or encompassing porous material having thermoplastically bonded directed fibers is provided between two respective battery cells of the at least one sub-group which are arranged one behind another along the spacing axis.

13. The battery module according claim 1, wherein the at least one deformable interlayer is arranged along the spacing axis between a pressure surface and the at least one battery cell.

14. The battery module according to claim 13, wherein at least one of the two pressure surfaces is embodied on a pressure plate, the pressure plate projecting along at least one extent axis, orthogonally to the spacing axis, beyond the at least one deformable interlayer that is closest to the pressure plate along the spacing axis.

15. The battery module according to claim 13, wherein at least one of the two pressure surfaces is embodied on a pressure plate, the pressure plate projecting along two mutually orthogonal extent axes, orthogonally to the spacing axis, beyond the at least one deformable interlayer that is closest to the pressure plate along the spacing axis.

* * * * *

UNITED STATES PATENT AND TRADEMARK OFFICE
CERTIFICATE OF CORRECTION

PATENT NO. : 11,444,313 B2
APPLICATION NO. : 16/609279
DATED : September 13, 2022
INVENTOR(S) : Dirk Montan et al.

It is certified that error appears in the above-identified patent and that said Letters Patent is hereby corrected as shown below:

In the Claims

Column 9, Line 56, Claim 1, the word "angle" should be replaced with --tangle--.

Column 10, Line 13, Claim 4, the word "angle" should be replaced with --tangle--.

Column 10, Line 16, Claim 5, the word "angle" should be replaced with --tangle--.

Column 10, Line 42, Claim 10, the word "angle" should be replaced with --tangle--.

Column 10, Line 57, Claim 12, the word "angle" should be replaced with --tangle--.

Signed and Sealed this
Fourteenth Day of February, 2023

*Katherine Kelly Vidal*

Katherine Kelly Vidal
*Director of the United States Patent and Trademark Office*